(12) United States Patent
Ren

(10) Patent No.: US 12,255,573 B2
(45) Date of Patent: Mar. 18, 2025

(54) POWER SYSTEM COMBINING PHOTOVOLTAIC POWER GENERATION AND HYDROGEN POWER GENERATION

(71) Applicant: Weidong Ren, Hangzhou (CN)

(72) Inventor: Weidong Ren, Hangzhou (CN)

( * ) Notice: Subject to any disclaimer, the term of this patent is extended or adjusted under 35 U.S.C. 154(b) by 0 days.

(21) Appl. No.: 18/679,473

(22) Filed: May 31, 2024

(65) Prior Publication Data

US 2024/0322738 A1  Sep. 26, 2024

(30) Foreign Application Priority Data

Sep. 14, 2023  (CN) .......................... 202322494459.9

(51) Int. Cl.
    *H02S 10/10*       (2014.01)
    *C25B 1/04*        (2021.01)
    *C25B 9/65*        (2021.01)
    *C25B 15/08*       (2006.01)
    *H01M 8/0656*      (2016.01)
    *H02S 40/32*       (2014.01)

(52) U.S. Cl.
    CPC ............... *H02S 10/10* (2014.12); *C25B 1/04* (2013.01); *C25B 9/65* (2021.01); *C25B 15/08* (2013.01); *H01M 8/0656* (2013.01); *H02S 40/32* (2014.12)

(58) Field of Classification Search
    None
    See application file for complete search history.

(56) References Cited

U.S. PATENT DOCUMENTS

| 2020/0096159 | A1* | 3/2020  | Todo | ........................ | F17D 3/01    |
| 2020/0381757 | A1* | 12/2020 | Jia  | ...................... | H01M 8/04201 |
| 2021/0292917 | A1* | 9/2021  | Lee  | ........................ | H02S 40/30   |

FOREIGN PATENT DOCUMENTS

CN        203112493 U   *   8/2013

OTHER PUBLICATIONS

CN203112493U—Machine Translation (Year: 2013).*

* cited by examiner

*Primary Examiner* — Brian R Ohara
*Assistant Examiner* — Patrick Marshall Greene
(74) *Attorney, Agent, or Firm* — Nitin Kaushik

(57) ABSTRACT

Disclosed is a power system combining photovoltaic power generation and hydrogen power generation, including: a building, a photovoltaic power generation device being installed on an upper end surface of the building, and a first inverter being installed on an output end of the photovoltaic power generation device through a connecting line; a water electrolysis hydrogen production equipment being installed inside a building, a first hydrogen storage tank being installed on one side of the building, a second hydrogen storage tank being installed on the other side of the building, and an oxygen storage tank being connected to an output end of the water electrolysis hydrogen production equipment through a pipeline. In the disclosure, there is no need to provide a special storage battery to store the electricity generated by photovoltaic power generation.

18 Claims, 5 Drawing Sheets

POWER SYSTEM COMBINING PHOTOVOLTAIC POWER GENERATION AND HYDROGEN POWER GENERATION

TECHNICAL FIELD

The disclosure relates to the technical field of power equipment, in particular to a power system combining photovoltaic power generation and hydrogen power generation.

BACKGROUND ART

The power system combining photovoltaic power generation and hydrogen power generation is a system with solar photovoltaic power generation and hydrogen power generation as the main energy sources. In this system, photovoltaic power generation converts solar energy into electric energy through solar photovoltaic conversion technology, and part of the electric energy is used electrolyze water to generate hydrogen, which can be stored for emergencies. When the power demand is higher than the photovoltaic power generation capacity, the stored hydrogen can be used to generate electric energy, which can be achieved by fuel cell technology, that is, hydrogen reacts with oxygen to generate electric energy and water, which can provide reliable power supply and continuous power supply in the absence of sunlight.

The patent document with the publication number CN114622246A discloses an energy-saving hydrogen charging station, including a building main body, including a hydrogen production equipment, a first gas storage tank, a second gas storage tank, a hydrogen charging equipment, a control system, a large power storage module, a solar power generation equipment located on a top of the building main body; further including a fuel generator to provide additional power to hydrogen production equipment.

The above device can generate clean energy, not only can be self-sufficient, but also can use excess clean energy to obtain additional income, however, in the process of use, a special storage battery is required to store the electricity generated by photovoltaic power generation, which is costly, and at the same time, the safety of the hydrogen storage tank is low.

SUMMARY OF THE INVENTION

The object of the disclosure is to solve the problems that the existing power system combining photovoltaic power generation and hydrogen power generation needs to provide a special storage battery to store the electricity generated by photovoltaic power generation, which is costly, and the safety of the hydrogen storage tank is low.

In order to achieve the above object, the disclosure provides the following technical solution: a power system combining photovoltaic power generation and hydrogen power generation, including: a building, wherein a photovoltaic power generation device is installed on an upper end surface of the building, and a first inverter is installed on an output end of the photovoltaic power generation device through a connecting line; a water electrolysis hydrogen production equipment is installed inside a building, a first hydrogen storage tank is installed on one side of the building, a second hydrogen storage tank is installed on the other side of the building, an oxygen storage tank is connected to an output end of the water electrolysis hydrogen production equipment through a pipeline, and a second solenoid valve switch is installed on a surface of the pipeline; a hydrogen power generator is installed on the output ends of the first hydrogen storage tank and the second hydrogen storage tank through a connecting pipe, and a third solenoid valve switch is installed on a surface of the connecting pipe, a second inverter is connected to an output end of the hydrogen power generator through the connecting line, a grid common connection point is connected to the second inverter through the connecting line, and a grid distribution network substation is connected to an output end of the grid common connection point through the connecting line; and a connecting assembly is installed on a surface of each of the first hydrogen storage tank and the second hydrogen storage tank, the connecting assembly includes a protective box fixed on a surface of the hydrogen storage tank, one side of the protective box is penetrated with a connecting pipe head fixed with the hydrogen storage tank, a first connecting flange is fixed on one end of the connecting pipe head, an inner cavity of the connecting pipe head is inserted with a hydrogen delivery pipe, a surface of the hydrogen delivery pipe is fixed with an outer pipe body, one end close to the connecting pipe head of the outer pipe body is fixed with a second connecting flange, a first sealing ring is clamped between the first connecting flange and the second connecting flange, and an inner cavity of the outer pipe body is sleeved with a second sealing ring arranged on the surface of the hydrogen delivery pipe.

As a further description of the above technical solution: an electricity controller is installed on an output end of the first inverter through the connecting line, and a self-use electrical appliance is installed on an output end of the electricity controller through the connecting line.

As a further description of the above technical solution: a water supply pipe is installed on an input end of the water electrolysis hydrogen production equipment.

As a further description of the above technical solution: a sale electric meter is installed between the second inverter and the grid common connection point.

As a further description of the above technical solution: a self-use electric meter is installed between the second inverter and the electricity controller.

As a further description of the above technical solution: the connecting pipe is connected and installed between the first hydrogen storage tank and the second hydrogen storage tank, and a hydrogen output end of the water electrolysis hydrogen production equipment is communicated with the connecting pipe, and two first solenoid switch valves are installed on the surface of the connecting pipe.

As a further description of the above technical solution: the first hydrogen storage tank and the second hydrogen storage tank are high-strength steel protective boxes with sealability, filled with inert gas inside.

In summary, since the technical solution is adopted, the present application has the following beneficial effects: in the disclosure, there is no need to provide a special storage battery to store the electricity generated by photovoltaic power generation, which saves the cost of the storage battery, can efficiently achieve the self-sufficiency of the electricity, and can guarantee that the electricity consumption of self-use electrical appliances in the building can be satisfied both during the day and at night. The hydrogen storage tank adopts a safety structure, which has high safety, and adopts two storage tanks that can meet the demand for charging and discharging hydrogen, which can not only generate excess electricity and sell same to the State Grid,

DESCRIPTION OF THE REFERENCE NUMERALS

1: building; 2: photovoltaic power generation device; 3: first inverter; 4: electricity controller; 5: self-use electrical appliance; 6: water electrolysis hydrogen production equipment; 7: first hydrogen storage tank; 8: second hydrogen storage tank; 9: oxygen storage tank; 10: first solenoid switch valve; 11: second solenoid valve switch; 12: water supply pipe; 13: hydrogen power generator; 14: third solenoid valve switch; 15: second inverter; 16: sale electric meter; 17: grid common connection point; 18: grid distribution network substation; 19: connecting assembly; 1901: protective box; 1902: connecting pipe head; 1903: first connecting flange; 1904: hydrogen delivery pipe; 1905: outer pipe body; 1906: second connecting flange; 1907: first sealing ring; 1908: second sealing ring; 20: self-use electric meter.

DETAILED DESCRIPTION OF THE INVENTION

The technical solution in the embodiment of the disclosure will be described clearly and completely below in conjunction with the accompanying drawings in the embodiment of the disclosure, and obviously, the described embodiments are only some embodiments of the disclosure, not all embodiments. Based on the embodiments of the disclosure, all other embodiments obtained by those skilled in the art without creative labor belong to the scope of protection of the disclosure.

Figure 1:
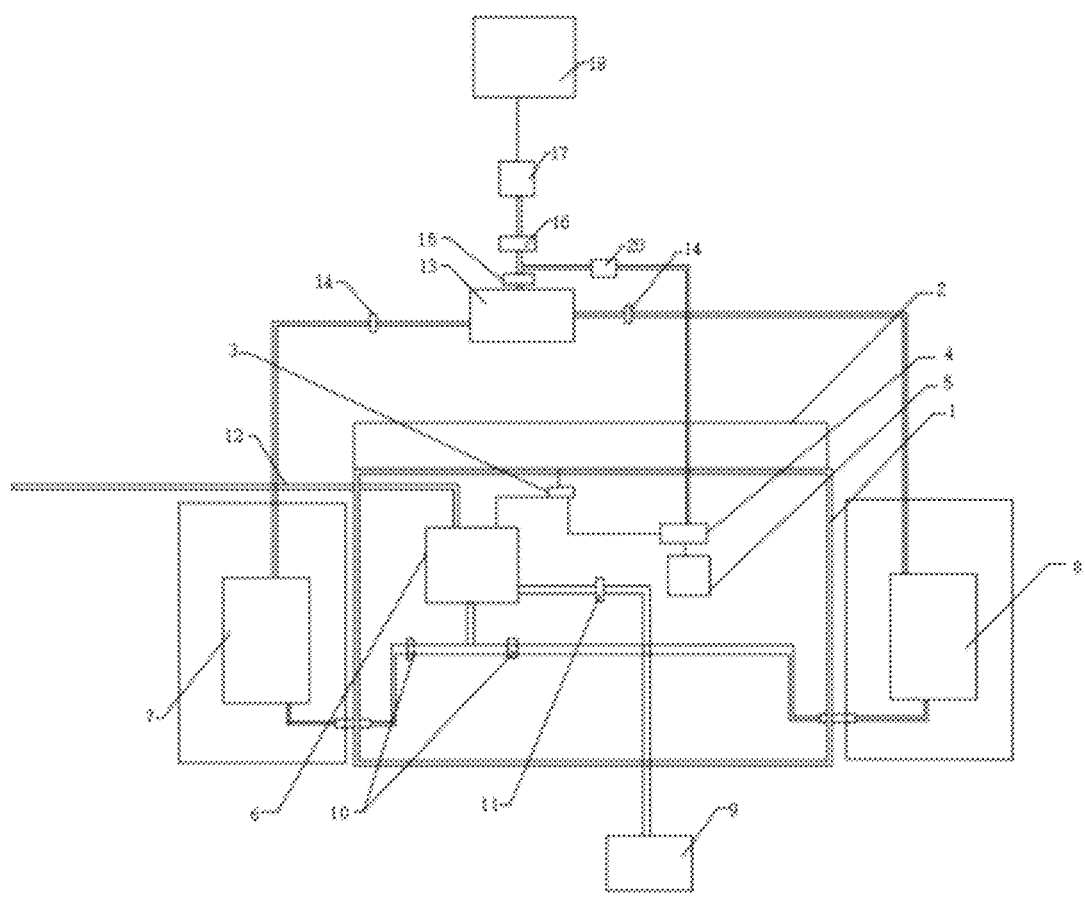
FIG. 1 is a structural schematic diagram of a power system combining photovoltaic power generation and hydrogen power generation of the disclosure.
Figure 2:
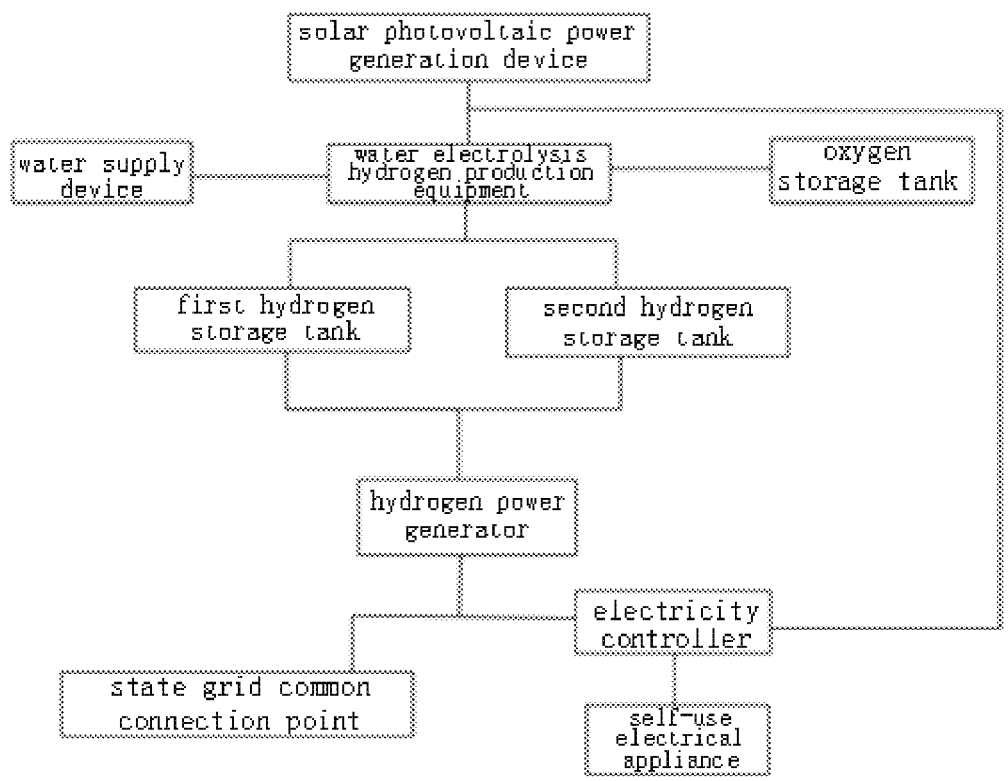
FIG. 2 is a module schematic diagram of the power system combining photovoltaic power generation and hydrogen power generation of the disclosure.
Figure 3:
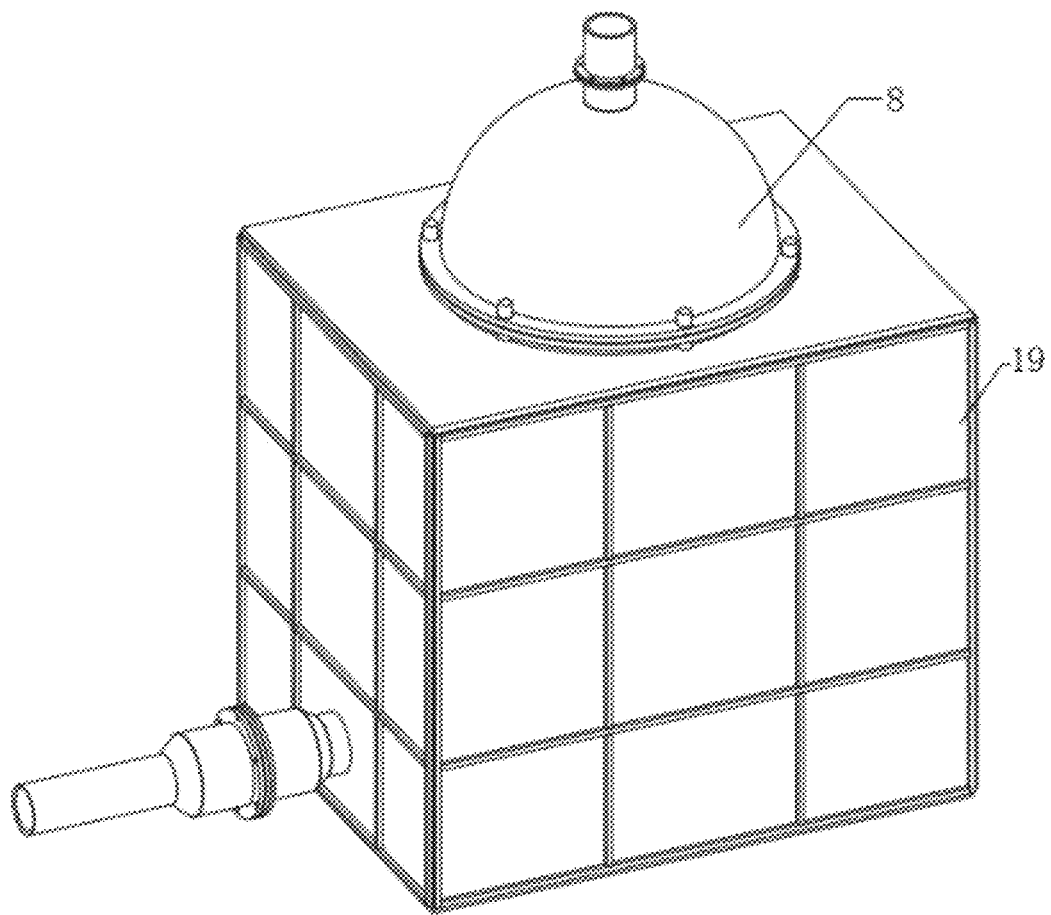
FIG. 3 is a structural schematic diagram of a connecting assembly connected to a hydrogen storage tank of the disclosure.
Figure 4:
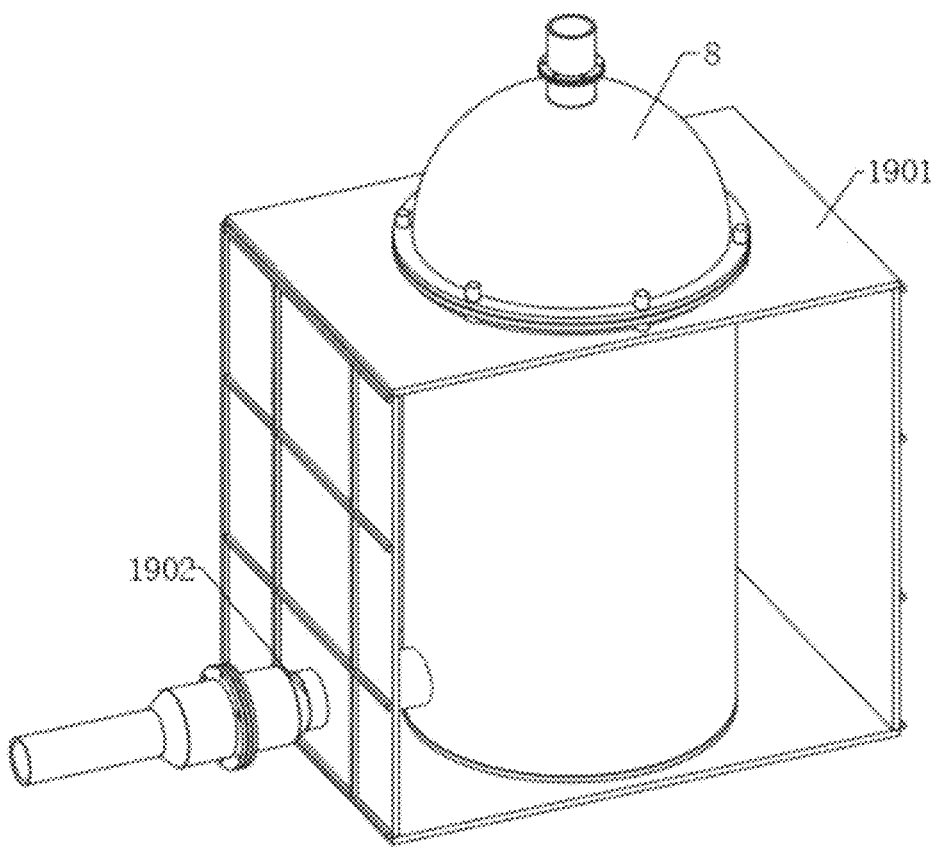
FIG. 4 is a structural schematic diagram of a section of a protective box of the disclosure.
Figure 5:
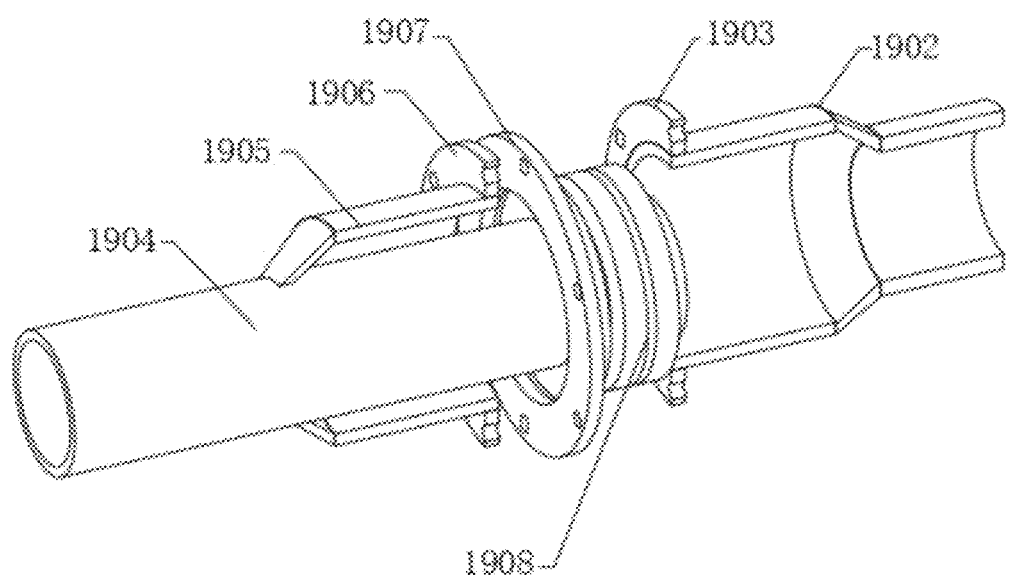
FIG. 5 is a structural schematic diagram of a section of the connecting assembly of the disclosure.

Referring to FIGS. 1 to 5, provided is a power system combining photovoltaic power generation and hydrogen power generation, including: a building 1, wherein a photovoltaic power generation device 2 is installed on an upper end surface of the building 1, and a first inverter 3 is installed on an output end of the photovoltaic power generation device 2 through a connecting line; a water electrolysis hydrogen production equipment 6 is installed inside a building 1, a first hydrogen storage tank 7 is installed on one side of the building 1, a second hydrogen storage tank 8 is installed on the other side of the building 1, an oxygen storage tank 9 is connected to an output end of the water electrolysis hydrogen production equipment 6 through a pipeline, and a second solenoid valve switch 11 is installed on a surface of the pipeline; a hydrogen power generator 13 installed on the output ends of the first hydrogen storage tank 7 and the second hydrogen storage tank 8 through a connecting pipe, and a third solenoid valve switch 14 is installed on a surface of the connecting pipe, a second inverter 15 is connected to an output end of the hydrogen power generator 13 through the connecting line, a grid common connection point 17 is connected to the second inverter 15 through the connecting line, and a grid distribution network substation 18 is connected to an output end of the grid common connection point 17 through the connecting line; a connecting assembly 19 is installed on a surface of each of the first hydrogen storage tank 7 and the second hydrogen storage tank 8, the connecting assembly 19 includes a protective box 1901 fixed on a surface of the hydrogen storage tank, one side of the protective box 1901 is penetrated with a connecting pipe head 1902 fixed with the hydrogen storage tank, a first connecting flange 1903 is fixed on one end of the connecting pipe head 1902, an inner cavity of the connecting pipe head 1902 is inserted with a hydrogen delivery pipe 1904, a surface of the hydrogen delivery pipe 1904 is fixed with an outer pipe body 1905, one end close to the connecting pipe head 1902 of the outer pipe body 1905 is fixed with a second connecting flange 1906, a first sealing ring 1907 is clamped between the first connecting flange 1903 and the second connecting flange 1906, and an inner cavity of the outer pipe body 1905 is sleeved with a second sealing ring 1908 arranged on the surface of the hydrogen delivery pipe 1904.

The hydrogen delivery pipe 1904 for delivering hydrogen of the water electrolysis hydrogen production equipment 6 is inserted into the connecting pipe head 1902, so that the second sealing ring 1908 on a surface of the hydrogen delivery pipe 1904 is movably connected with an inner wall of the connecting pipe head 1902, and then the first sealing ring 1907 is placed between the first connecting flange 1903 and the second connecting flange 1906, the first connecting flange 1903 and the second connecting flange 1906 are assembled by bolts, so that the hydrogen delivery pipe 1904 is communicated and connected with the connecting pipe head 1902, and a double-layer sealing structure is formed by the first sealing ring 1907 and the second sealing ring 1908.

The electric energy of the solar photovoltaic power generation device can normally maintain the power supply needs of the self-use electrical appliance, that is, the electric energy is greater than the power generation required by the self-use electrical appliance.

During the day, the electricity generated by a solar photovoltaic power generation device 2 is converted through the first inverter 3 and supplied to the water electrolysis hydrogen production equipment 6 for hydrogen production, and is stored by the first hydrogen storage tank 7 and the second hydrogen storage tank 8. The purpose of the two hydrogen storage tanks is to ensure that even if one is full, the other one can continue to charge, or to ensure that one outputs hydrogen, and the other one is supplied to the hydrogen power generator for power generation, not affecting use.

At night, the solar photovoltaic power generation device 2 does not work, the electricity is completely generated by the hydrogen power generator 13 with the hydrogen output from the first hydrogen storage tank 7 and the second hydrogen storage tank 8.

At night, priority is given to ensuring the electricity demand of self-use electric meter, that is, self-use electrical appliance 5, and the excess part is transmitted to the grid distribution network substation 18 via the state grid common connection point 17 through the sale electric meter 16, and the sale amount is recorded by the sale electric meter 16.

Further, an electricity controller 4 is installed on an output end of the first inverter 3 through the connecting line, and a self-use electrical appliance 5 is installed on an output end of the electricity controller 4 through the connecting line.

Further, a water supply pipe 12 is installed on an input end of the water electrolysis hydrogen production equipment 6.

Further, a sale electric meter 16 is installed between the second inverter 15 and the grid common connection point 17.

Further, a self-use electric meter 20 is installed between the second inverter 15 and the electricity controller 4.

Further, the connecting pipe is connected and installed between the first hydrogen storage tank 7 and the second hydrogen storage tank 8, and a hydrogen output end of the water electrolysis hydrogen production equipment 6 is communicated with the connecting pipe, and two first solenoid switch valves 10 are installed on the surface of the connecting pipe.

Further, the first hydrogen storage tank 7 and the second hydrogen storage tank 8 are high-strength steel protective boxes with sealability, filled with inert gas inside.

Working principle: before use, the hydrogen delivery pipe 1904 for delivering hydrogen of the water electrolysis hydrogen production equipment 6 is inserted into the connecting pipe head 1902, so that the second sealing ring 1908 on a surface of the hydrogen delivery pipe 1904 is movably connected with an inner wall of the connecting pipe head 1902, and then the first sealing ring 1907 is placed between the first connecting flange 1903 and the second connecting flange 1906, the first connecting flange 1903 and the second connecting flange 1906 are assembled by bolts, so that the hydrogen delivery pipe 1904 is communicated and connected with the connecting pipe head 1902, and a double-layer sealing structure is formed by the first sealing ring 1907 and the second sealing ring 1908. The electric energy of the solar photovoltaic power generation device can normally maintain the power supply needs of the self-use electrical appliance, that is, the electric energy is greater than the power generation required by the self-use electrical appliance. During the day, the electricity generated by a solar photovoltaic power generation device 2 is converted through the first inverter 3 and supplied to the water electrolysis hydrogen production equipment 6 for hydrogen production, and is stored by the first hydrogen storage tank 7 and the second hydrogen storage tank 8. The purpose of the two hydrogen storage tanks is to ensure that even if one is full, the other one can continue to charge, or to ensure that one outputs hydrogen, and the other one is supplied to the hydrogen power generator for power generation, not affecting use. At night, the solar photovoltaic power generation device 2 does not work, the electricity is completely generated by the hydrogen power generator 13 with the hydrogen output from the first hydrogen storage tank 7 and the second hydrogen storage tank 8. At night, priority is given to ensuring the electricity demand of self-use electric meter, that is, self-use electrical appliance 5, and the excess part is transmitted to the grid distribution network substation 18 via the state grid common connection point 17 through the sale electric meter 16, and the sale amount is recorded by the sale electric meter 16. The working principle of the disclosure is thus completed.

The above is only a preferred embodiment of the disclosure and the scope of protection of the disclosure is not limited to this, and any equivalents and changes made by those skilled in the art according to the technical solution and conception of the disclosure within the technical scope of the disclosure shall be covered within the scope of protection of the present invention.

The invention claimed is:

1. A power system combining photovoltaic power generation and hydrogen power generation, comprising:
    a building (1), wherein a photovoltaic power generation device (2) is installed on an upper end surface of the building (1), and a first inverter (3) is installed on an output end of the photovoltaic power generation device (2) through a connecting line;
    a water electrolysis hydrogen production equipment (6) is installed inside a building (1), a first hydrogen storage tank (7) is installed on one side of the building (1), a second hydrogen storage tank (8) is installed on the other side of the building (1), an oxygen storage tank (9) is connected to an output end of the water electrolysis hydrogen production equipment (6) through a pipeline, and a second solenoid valve switch (11) is installed on a surface of the pipeline;
    a hydrogen power generator (13) is installed on the output ends of the first hydrogen storage tank (7) and the second hydrogen storage tank (8) through a connecting pipe, a third solenoid valve switch (14) is installed on a surface of the connecting pipe, a second inverter (15) is connected to an output end of the hydrogen power generator (13) through the connecting line, a grid common connection point (17) is connected to the second inverter (15) through the connecting line, and a grid distribution network substation (18) is connected to an output end of the grid common connection point (17) through the connecting line; and
    a connecting assembly (19) is installed on a surface of each of the first hydrogen storage tank (7) and the second hydrogen storage tank (8), the connecting assembly (19) includes a protective box (1901) fixed on a surface of the hydrogen storage tank, one side of the protective box (1901) is penetrated with a connecting pipe head (1902) fixed with the hydrogen storage tank, a first connecting flange (1903) is fixed on one end of the connecting pipe head (1902), an inner cavity of the connecting pipe head (1902) is inserted with a hydrogen delivery pipe (1904), a surface of the hydrogen delivery pipe (1904) is fixed with an outer pipe body (1905), one end close to the connecting pipe head (1902) of the outer pipe body (1905) is fixed with a second connecting flange (1906), a first sealing ring (1907) is clamped between the first connecting flange (1903) and the second connecting flange (1906), and an inner cavity of the outer pipe body (1905) is sleeved with a second sealing ring (1908) arranged on the surface of the hydrogen delivery pipe (1904),
    wherein an electricity controller (4) is installed on an output end of the first inverter (3) through the connecting line, and a self-use electrical appliance (5) is installed on an output end of the electricity controller (4) through the connecting line.

2. The power system combining photovoltaic power generation and hydrogen power generation of claim 1, wherein a water supply pipe (12) is installed on an input end of the water electrolysis hydrogen production equipment (6).

3. The power system combining photovoltaic power generation and hydrogen power generation of claim 1, wherein a sale electric meter (16) is installed between the second inverter (15) and the grid common connection point (17).

4. The power system combining photovoltaic power generation and hydrogen power generation of claim 1, wherein a self-use electric meter (20) is installed between the second inverter (15) and the electricity controller (4) through the connecting line.

5. The power system combining photovoltaic power generation and hydrogen power generation of claim 1, wherein a connecting pipe is connected and installed between the first hydrogen storage tank (7) and the second hydrogen storage tank (8), and a hydrogen output end of the water electrolysis hydrogen production equipment (6) is communicated with the connecting pipe, and two first solenoid switch valves (10) are installed on a surface of the connecting pipe.

6. The power system combining photovoltaic power generation and hydrogen power generation of claim 1, wherein the first hydrogen storage tank (7) and the second hydrogen storage tank (8) are sealed boxes, which are made of steel and filled with inert gas inside.

7. A power system combining photovoltaic power generation and hydrogen power generation, comprising:
  a building (1), wherein a photovoltaic power generation device (2) is installed on an upper end surface of the building (1), and a first inverter (3) is installed on an output end of the photovoltaic power generation device (2) through a connecting line;
  a water electrolysis hydrogen production equipment (6) is installed inside a building (1), a first hydrogen storage tank (7) is installed on one side of the building (1), a second hydrogen storage tank (8) is installed on the other side of the building (1), an oxygen storage tank (9) is connected to an output end of the water electrolysis hydrogen production equipment (6) through a pipeline, and a second solenoid valve switch (11) is installed on a surface of the pipeline;
  a hydrogen power generator (13) is installed on the output ends of the first hydrogen storage tank (7) and the second hydrogen storage tank (8) through a connecting pipe, a third solenoid valve switch (14) is installed on a surface of the connecting pipe, a second inverter (15) is connected to an output end of the hydrogen power generator (13) through the connecting line, a grid common connection point (17) is connected to the second inverter (15) through the connecting line, and a grid distribution network substation (18) is connected to an output end of the grid common connection point (17) through the connecting line; and
  a connecting assembly (19) is installed on a surface of each of the first hydrogen storage tank (7) and the second hydrogen storage tank (8), the connecting assembly (19) includes a protective box (1901) fixed on a surface of the hydrogen storage tank, one side of the protective box (1901) is penetrated with a connecting pipe head (1902) fixed with the hydrogen storage tank, a first connecting flange (1903) is fixed on one end of the connecting pipe head (1902), an inner cavity of the connecting pipe head (1902) is inserted with a hydrogen delivery pipe (1904), a surface of the hydrogen delivery pipe (1904) is fixed with an outer pipe body (1905), one end close to the connecting pipe head (1902) of the outer pipe body (1905) is fixed with a second connecting flange (1906), a first sealing ring (1907) is clamped between the first connecting flange (1903) and the second connecting flange (1906), and an inner cavity of the outer pipe body (1905) is sleeved with a second sealing ring (1908) arranged on the surface of the hydrogen delivery pipe (1904),
  wherein a connecting pipe is connected and installed between the first hydrogen storage tank (7) and the second hydrogen storage tank (8), and a hydrogen output end of the water electrolysis hydrogen production equipment (6) is communicated with the connecting pipe, and two first solenoid switch valves (10) are installed on a surface of the connecting pipe.

8. The power system combining photovoltaic power generation and hydrogen power generation of claim 7, wherein an electricity controller (4) is installed on an output end of the first inverter (3) through the connecting line, and a self-use electrical appliance (5) is installed on an output end of the electricity controller (4) through the connecting line.

9. The power system combining photovoltaic power generation and hydrogen power generation of claim 7, wherein a water supply pipe (12) is installed on an input end of the water electrolysis hydrogen production equipment (6).

10. The power system combining photovoltaic power generation and hydrogen power generation of claim 7, wherein a sale electric meter (16) is installed between the second inverter (15) and the grid common connection point (17).

11. The power system combining photovoltaic power generation and hydrogen power generation of claim 7, wherein a self-use electric meter (20) is installed between the second inverter (15) and the electricity controller (4) through the connecting line.

12. The power system combining photovoltaic power generation and hydrogen power generation of claim 7, wherein the first hydrogen storage tank (7) and the second hydrogen storage tank (8) are sealed boxes, which are made of steel and filled with inert gas inside.

13. A power system combining photovoltaic power generation and hydrogen power generation, comprising:
  a building (1), wherein a photovoltaic power generation device (2) is installed on an upper end surface of the building (1), and a first inverter (3) is installed on an output end of the photovoltaic power generation device (2) through a connecting line;
  a water electrolysis hydrogen production equipment (6) is installed inside a building (1), a first hydrogen storage tank (7) is installed on one side of the building (1), a second hydrogen storage tank (8) is installed on the other side of the building (1), an oxygen storage tank (9) is connected to an output end of the water electrolysis hydrogen production equipment (6) through a pipeline, and a second solenoid valve switch (11) is installed on a surface of the pipeline;
  a hydrogen power generator (13) is installed on the output ends of the first hydrogen storage tank (7) and the second hydrogen storage tank (8) through a connecting pipe, a third solenoid valve switch (14) is installed on a surface of the connecting pipe, a second inverter (15) is connected to an output end of the hydrogen power generator (13) through the connecting line, a grid common connection point (17) is connected to the second inverter (15) through the connecting line, and a grid distribution network substation (18) is connected to an output end of the grid common connection point (17) through the connecting line; and
  a connecting assembly (19) is installed on a surface of each of the first hydrogen storage tank (7) and the second hydrogen storage tank (8), the connecting assembly (19) includes a protective box (1901) fixed on a surface of the hydrogen storage tank, one side of the protective box (1901) is penetrated with a connecting pipe head (1902) fixed with the hydrogen storage tank, a first connecting flange (1903) is fixed on one end of the connecting pipe head (1902), an inner cavity of the connecting pipe head (1902) is inserted with a hydrogen delivery pipe (1904), a surface of the hydrogen delivery pipe (1904) is fixed with an outer pipe body (1905), one end close to the connecting pipe head (1902) of the outer pipe body (1905) is fixed with a second connecting flange (1906), a first sealing ring (1907) is clamped between the first connecting flange (1903) and the second connecting flange (1906), and an inner cavity of the outer pipe body (1905) is sleeved with a second sealing ring (1908) arranged on the surface of the hydrogen delivery pipe (1904), the first hydrogen storage tank (7) and the second hydrogen storage tank (8) are sealed boxes, which are made of steel and filled with inert gas inside.

14. The power system combining photovoltaic power generation and hydrogen power generation of claim 13, wherein an electricity controller (4) is installed on an output end of the first inverter (3) through the connecting line, and a self-use electrical appliance (5) is installed on an output end of the electricity controller (4) through the connecting line.

15. The power system combining photovoltaic power generation and hydrogen power generation of claim 13, wherein a water supply pipe (12) is installed on an input end of the water electrolysis hydrogen production equipment (6).

16. The power system combining photovoltaic power generation and hydrogen power generation of claim 13, wherein a sale electric meter (16) is installed between the second inverter (15) and the grid common connection point (17).

17. The power system combining photovoltaic power generation and hydrogen power generation of claim 13, wherein a self-use electric meter (20) is installed between the second inverter (15) and the electricity controller (4) through the connecting line.

18. The power system combining photovoltaic power generation and hydrogen power generation of claim 1, wherein a connecting pipe is connected and installed between the first hydrogen storage tank (7) and the second hydrogen storage tank (8), and a hydrogen output end of the water electrolysis hydrogen production equipment (6) is communicated with the connecting pipe, and two first solenoid switch valves (10) are installed on a surface of the connecting pipe.

\* \* \* \* \*